(12) United States Patent
Mott

(10) Patent No.: US 6,253,633 B1
(45) Date of Patent: *Jul. 3, 2001

(54) TORSIONALLY COMPLIANT SPROCKET SYSTEM FOR BALANCE SHAFT DRIVE

(75) Inventor: Philip J. Mott, Dryden, NY (US)

(73) Assignee: BorgWarner Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/608,271

(22) Filed: Jun. 30, 2000

Related U.S. Application Data

(62) Division of application No. 09/154,814, filed on Sep. 17, 1998, now Pat. No. 6,109,227.

(51) Int. Cl.[7] .................................................. F16H 55/14
(52) U.S. Cl. ............................ 74/411; 74/574; 464/57; 123/192.1
(58) Field of Search ................................ 123/90.31, 192.1, 123/192.2; 74/411, 574; 464/57, 58, 59, 68

(56) References Cited

U.S. PATENT DOCUMENTS

| | | | | |
|---|---|---|---|---|
| 86,533 | * | 2/1869 | Hafner | 464/59 |
| 198,078 | * | 12/1877 | Buschmann et al. | 464/59 |
| 431,124 | * | 7/1890 | Rae | 464/59 |
| 768,883 | * | 8/1904 | Nelson | 464/59 |
| 994,199 | * | 6/1911 | Richards et al. | 464/59 |
| 1,008,379 | * | 11/1911 | Sneeringer | 464/59 |
| 1,116,370 | * | 11/1914 | Bendix | 74/7 R |
| 1,196,349 | * | 8/1916 | Gilbert | 192/55.51 |
| 1,535,639 | * | 4/1925 | Weber | 318/9 |
| 4,139,995 | | 2/1979 | Lamarche | 64/27 |
| 4,254,985 | | 3/1981 | Kirschner | 295/7 |
| 4,317,388 | | 3/1982 | Wojcikowski | 74/574 |
| 4,728,832 | * | 3/1988 | Jatnieks et al. | 310/41 |
| 4,952,194 | | 8/1990 | Eckel et al. | 464/60 |
| 5,308,289 | | 5/1994 | Funahashi | 474/94 |
| 5,619,887 | | 4/1997 | Simpson | 74/574 |
| 5,655,416 | | 8/1997 | Mott | 74/574 |

FOREIGN PATENT DOCUMENTS

| | | |
|---|---|---|
| 129 661A | 1/1939 | (CH) . |
| 718 377C | 2/1942 | (DE) . |
| 44 21 637A | 1/1996 | (DE) . |
| 19919 449A | 11/1999 | (DE) . |
| 792 330A | 11/1955 | (GB) . |
| 6-109100 | 4/1994 | (JP) . |
| WO 99 43965A | 9/1999 | (WO) . |

* cited by examiner

Primary Examiner—Weilun Lo
(74) Attorney, Agent, or Firm—Fitch, Even, Tabin & Flannery; Greg Dziegielewski

(57) ABSTRACT

The present invention relates to a torsionally compliant sprocket assembly which reduces the transfer of the crankshaft torsional oscillations to other components in the engine such as the balance shaft drives. The assembly comprises a first sprocket, second sprocket and a planar torsion spring located between the two sprockets and the shaft.

9 Claims, 3 Drawing Sheets

TORSIONALLY COMPLIANT SPROCKET SYSTEM FOR BALANCE SHAFT DRIVE

This application is a division of application Ser. No. 09/154,814, filed Sep. 17, 1998, now U.S. Pat. No. 6,109,227.

FIELD OF INVENTION

This invention relates to the isolating of vibrations in rotating devices. More particularly, this invention has particular application to engines timing systems with two sprockets located side by side in close proximity on a rotating shaft. This invention provides a torsionally compliant sprocket system that absorbs torsional loads and vibrations from the shaft.

BACKGROUND OF THE INVENTION

Engine timing systems typically include at least one driving sprocket located on the engine crankshaft and at least one driven sprocket on an engine camshaft. The rotation of the crankshaft causes the rotation of the camshaft through an endless power chain transmission.

More complicated engine timing systems connect a crankshaft with two or more shafts by a pair of chains. The crankshaft includes two sprockets. Each chain is connected to one or more driven sprockets, including sprockets on each of the two overhead camshafts. Typically, the chain systems in more complicated engine timing systems will include tensioners on the slack side of each chain to maintain chain tension and snubbers on the tight side of each chain to control chain movement during operation.

Some engine timing systems have two (or dual) overhead camshafts for each bank of cylinders. The dual camshafts on a single bank can both be rotated by connection to the same chain. Alternatively, the second camshaft can be rotated by an additional camshaft-to-camshaft chain drive. The cam-to-cam drive chain can also include single or dual tensioners for chain control.

Some engine systems, such as three cylinder engines, due to the number of cylinders and arrangement of the cylinders are inherently unbalanced. In these engines, balance shafts are employed to balance the inherent inbalance of the engine. Since the balance shafts are driven by the crankshaft, torsional vibrations and oscillations along the crankshaft may be transferred to the balance shafts and through the chain drive and create unnecessary high chain tensions throughout the engine timing system and accessory drive.

The rotating crankshaft may undergo resonance at certain frequencies. Since the balance shafts are coupled to the crankshaft by one or more balance shaft chains, the balance shafts are directly exposed to these extreme resonant torsional oscillations. Vibrations from the resonance of the crankshaft are often transferred throughout the system, including the balance shafts and can significantly increase the load on the systems and components, increase the noise from the engine, and increase wear and fatigue loading of the timing chains and components.

Conventional approaches to this problem have focused on reducing rotational perturbations of the crankshaft by means of internal devices such as Lanchaster dampers and harmonic balancers. External devices such as fluid engine mounts and engine mounts having adjustable damping characteristics have also been used. By contrast, the present invention focuses on absorbing the torsional vibrations of a crankshaft by using a torsionally compliant sprocket system on the crankshaft to absorb the crankshaft torsional vibrations and prevent their transfer to other parts of the engine system.

Some prior art timing systems use a rubber damper piece placed against a sprocket and bolted to the shaft to absorb vibrations. However, the rubber damper piece may fracture from the extreme resonance vibrations. Other timing systems employ a weight that is positioned on the shaft and held against the sprocket by a Belleville washer. Frictional material is also placed at the area of contact between the sprocket and the weight to absorb vibrations. These systems, while effective at damping have drawbacks in terms of production, assembly and durability.

An example of the above-described prior vibration damping techniques is found in Wojcikowski, U.S. Pat. No. 4,317,388, which issued on Mar. 2, 1982. That patent discloses a gear with split damping rings of diameter slightly smaller than the gear bolted to each side of the gear with a tapered bolt and nut assembly. Tightening of the bolt cams the damping ring outward, producing pressure circumferentially against the rim of the gear and causing tensile stress on the gear. Additionally, tightening of the bolts presses the elastomeric washers associated with the bolt and nut assembly firmly against the web of the gear which damps the stress wave passing from the rim through the web and into the shaft. In contrast to this prior art structure, the present invention utilizes a novel arrangement of sprockets to produce a torsionally compliant sprocket assembly to reduce the transfer of vibrations of the crankshaft to other parts of the engine system.

Another example of the above-described prior art damping techniques is Funashashi, U.S. Pat. No. 5,308,289, which issued on May 3, 1994. The damper pulley disclosed therein consists of a pulley joined to a damper mass member with a resilient rubber member. The pulley and the damper-mass member each have at least two projections, and the projections of the pulley contact the sides of the projections of the damper mass member. A second resilient rubber member is placed between the contacting projections. Bending vibrations from the crankshaft cause the pulley to vibrate in the radial direction and the first resilient rubber member deforms, causing the dynamic damper to resonate with the pulley and restrain the bending vibrations. Torsional vibrations cause the pulley to vibrate in the circumferential direction. The second resilient rubber member undergoes compression deformation, decreasing the spring force and raising the resonance frequency against the torsional vibrations. The present invention avoids the use of rubber which has wear problems in use.

Another example of a prior damping technique is Kirschner, U.S. Pat. No. 4,254,985, which issued on Mar. 10, 1981. That patent discloses a damping ring for rotating wheels that includes a viscoelastic damping material disposed within an annular groove in the surface of the wheel. A metal ring is positioned in the groove at the top of the damping material. In operation, the damping material undergoes shear deformation.

SUMMARY OF THE INVENTION

In an engine timing system, an endless chain connects a driving sprocket on the crankshaft to a driven sprocket on a camshaft. The rotation of the driving sprocket advances the chain, which turns the driven sprocket and the cam shaft. Torsional vibrations arise in the system and are transmitted along the crankshaft which is spinning at a nonconstant speed. These vibrations may be excessively large at resonance conditions. To absorb these vibrations, and minimize the transfer of these vibrations to other portions of the engine, the present invention utilizes a torsionally compliant sprocket assembly positioned along the crankshaft. The torsionally compliant sprocket includes a first driving sprocket, a serpentine planar torsion spring, and a second sprocket positioned on the crankshaft, used in conjunction with the engine balancer drive system. The planar torsion spring is held abuttingly in contact with the driving sprocket on its one side and the second sprocket on its other side. However, the planar torsion spring moves independently of the two sprockets. Movement of the planar torsion spring acts to absorb the crankshaft torsional vibrations and prevent their transfer to the tension on the balance shaft chain and balance shaft drive. The planar torsional spring serves to isolate the driving sprocket from the balance shaft without compromising the integrity of the drive.

BRIEF DESCRIPTION OF THE DRAWINGS

For a more complete understanding of the invention, one should refer to the embodiments illustrated in greater detail in the drawings and described below by way of examples of the invention. In the drawings, which are not to scale.

DETAILED DESCRIPTION

Figure 1:
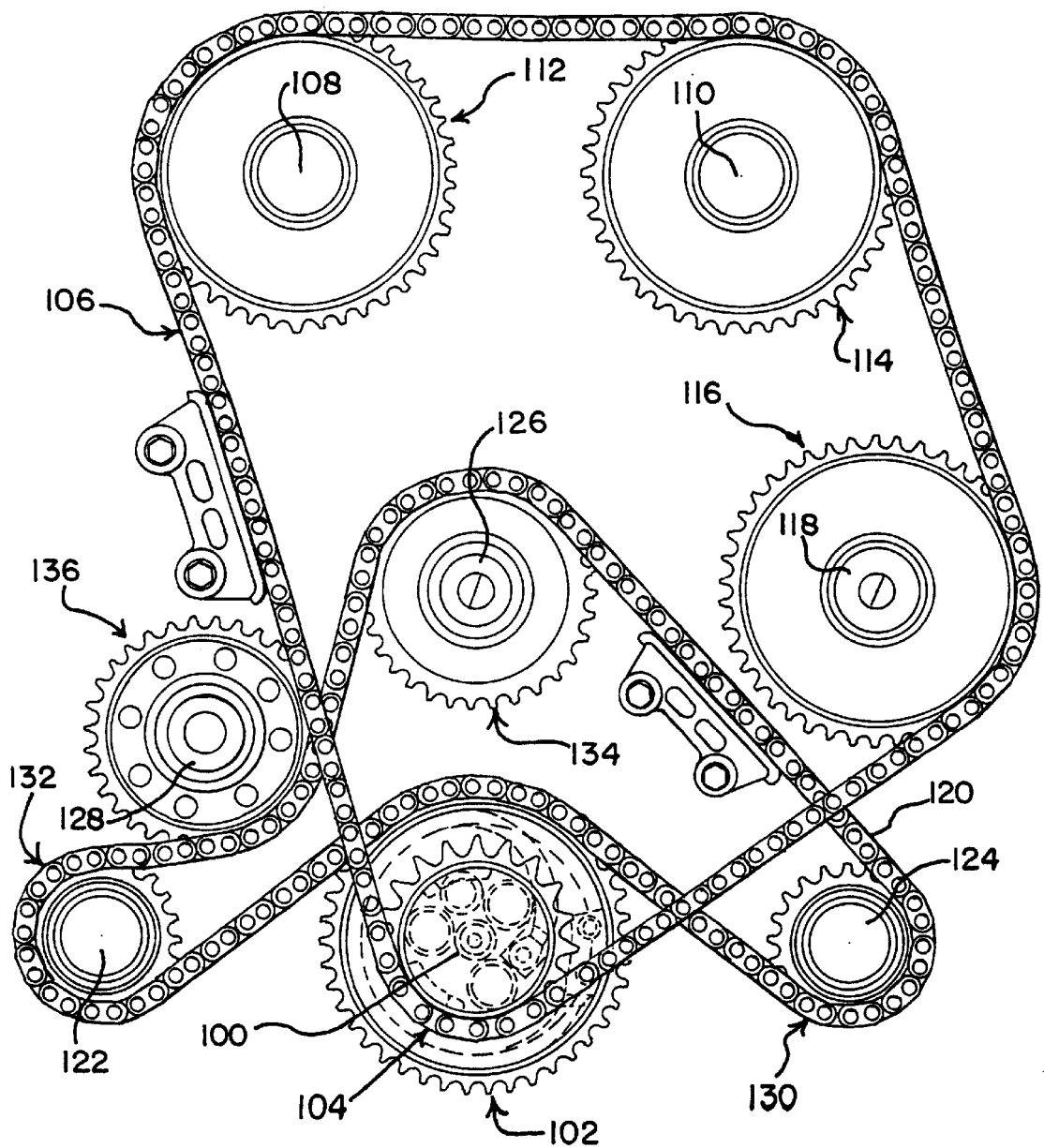
FIG. 1 is a schematic view of a engine system which incorporates the torsionally compliant sprocket assembly of the instant invention.

An example of a multiple axis timing chain system, in which the present invention is utilized, is schematically illustrated in FIG. 1. The sprockets can be either single units or sprocket pairs, with the pairs having aligned teeth or having their teeth phased, or offset, by a portion of one tooth. Phased sprockets and chain assemblies are described in U.S. Pat. No. 5,427,580, which is incorporated herein by reference.

Crankshaft 100 provides power output through sprocket 102, and sprocket pair 104. Crankshaft sprocket pair 104, which includes sprockets 103 and 105, carries load or transmits power to chain assemblies (or chain pairs) 106. The chain assemblies 106 provide the primary drive of the two overhead camshafts 108 and 110. Camshaft 108 includes a pair of phased sprockets 112, and camshaft 110 also includes a pair of phased sprockets 114. The chain assemblies 106 also drive idler sprockets 116, which may or may not be phased.

The second crankshaft sprocket 102 is a balance shaft drive sprocket that provides power transmission through chain 120 to a pair of balance shafts 122, 124, and idler shaft 126 and to an accessory drive 128, such as an oil pump drive. Chain 120 therefore transmits power from the crankshaft balance shaft sprocket 102 to a first sprocket 130 on balance shaft 124 and to a second sprocket 132 on balance shaft 122. The chain also drives idler sprocket 134 on idler shaft 126 and accessory drive sprocket 136 on accessory drive 128. The balance shaft drive system can include a pair of chains in place of single chain 120, and a pair of sprockets in place of single sprocket 102. In such a system, one chain of the pair of chains would preferably drive the idler sprocket while the other chain of the pair of chains would drive the accessory drive.

The chain assemblies of the multi-axis chain drive system shown in FIG. 1 utilize conventional snubbers and tensioning devices to maintain tension and lateral control in various portions of the chain drive. Such devices are known to those skilled in the chain art.

In this system, the crankshaft itself and the driving sprocket mounted on the crankshaft is subject to torsional loads and vibrations and may undergo resonance at certain frequencies. Vibrations from the resonance condition are transferred through the system due to the interconnection of various components of the system. Since the balance shafts are coupled to the crankshaft by a chain, the balance shafts are directly exposed to crankshaft torsional oscillations and vibrations.

Figure 2:
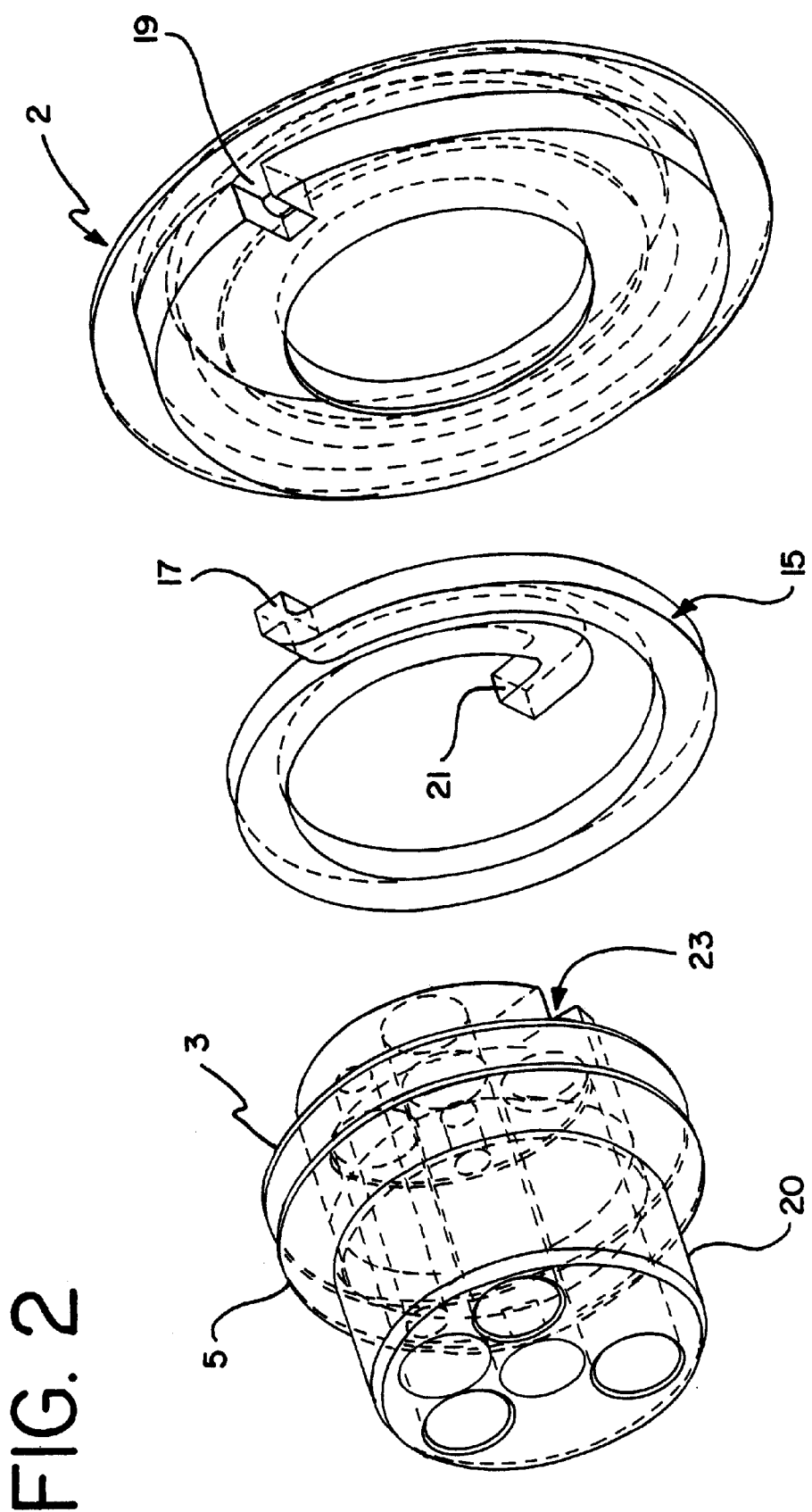
FIG. 2 is an exploded view of the torsionally compliant sprocket system of the present invention.
Figure 4:
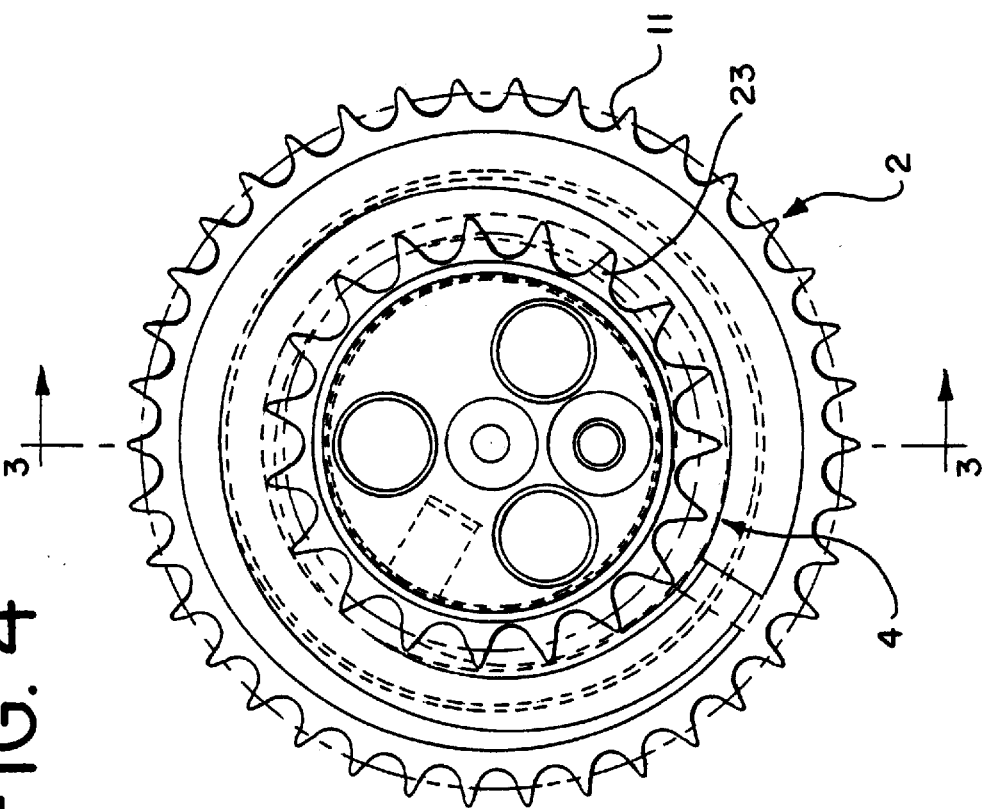
FIG. 4 is a plan view of the embodiment shown in FIG.2 illustrating the sprocket assembly.
Figure 3:
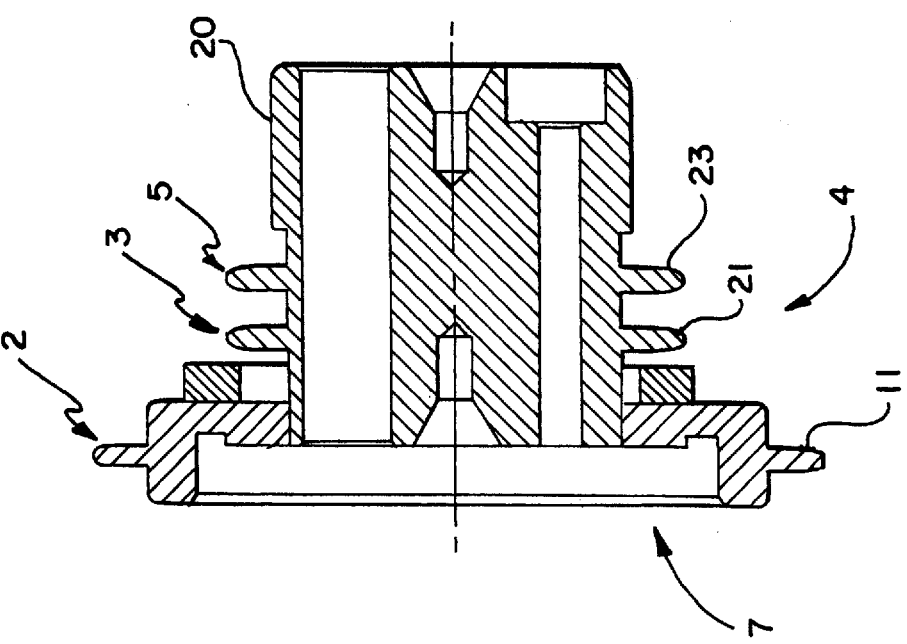
FIG. 3 is a sectional view taken along line 3—3 in FIG. 4, illustrating the torsionally compliant sprocket assembly on the crankshaft.

FIGS. 2, 3 and 4 illustrate a torsionally compliant sprocket system, with crankshaft drive sprockets 3 and 5, of sprocket pair 4. Sprocket pair 4 corresponds to sprocket pair 104 illustrated in FIG. 1. Crankshaft drive sprocket 2 drives the balance shafts. Sprocket 2 corresponds to sprocket 102 in FIG. 1. The sprockets are shown schematically in FIG. 2, without the individual sprocket teeth.

The crankshaft sprockets 3, 5 may be conventional involute tooth sprockets. The driving crankshaft sprockets 3,5 are mounted on a hub 20. The sprockets 3,5 are mounted on the hub 20 by any suitable fastening means such as weldment, splines or keyways. A pair of chains are disposed on teeth 21, 23 of the sprockets 3, 5 which connects the crankshaft to the camshafts. The size and dimensions of the driving sprocket are dependent upon the engine and configuration of the system.

The torsionally compliant sprocket assembly further includes a balance shaft drive sprocket 2 which is also mounted on the hub 20. The balance shaft drive sprocket 2 can also be any conventional sprocket with dimensions dependent upon the system configuration and power requirements. This sprocket is also mounted on the hub 20 and includes a central opening 7 to permit connection of the hub and sprocket assembly to the crankshaft. A chain is disposed about the teeth 11 of the sprocket 2 and drivingly connects the sprockets on the balance shafts.

The planar torsion spring 15, shown in FIG. 2, is sized to fit between the balance shaft sprocket 2 and hub 20. The planar torsion spring is adapted to move independently of the two sprockets. The planar torsional spring serves to absorb the vibrations and the torsional forces from the crankshaft.

The planar torsion spring 15 can be mounted around the crankshaft in any manner provided that it is located between the sprocket and the hub. Preferably, the planar torsion spring is wrapped in a circular fashion around the crankshaft in a spiral shape. A first end 17 of the planar torsion spring 15 is attached to the balance shaft sprocket 2 by any known means, but is preferably fitted into a slot 19 formed in the side of the sprocket. The second end 21 of the planar torsion spring 15, is preferably fitted into a slot 23 formed in the hub 20, as shown in FIG. 2.

In operation of the torsionally compliant sprocket assembly, the planar torsion spring absorbs torsional oscillations from the crankshaft during rotation of the crankshaft. Without the spring 15, vibrations in the crankshaft will be transmitted from the crankshaft through the hub and sprockets and then to the balance shafts and their components. The torsional spring will deform and permit some relative rotation between the balance shaft sprocket 2 and the hub 20. Thus, the sprocket 2 must be mounted on the hub to permit some relative rotation.

The torsionally compliant sprocket assembly can be used on any rotating shaft with two sprockets located thereon in close proximity of each other. In particular, the torsionally compliant sprocket assembly can serve as a compliance mechanism and be used on any rotating shaft in which the dissipation of torsional forces and vibrations is desired.

Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

What is claimed is:

1. A torsionally compliant sprocket system comprising:
   a first sprocket positioned along a shaft;
   a second sprocket positioned along said shaft in close proximity with said first sprocket;
   a planar torsion spring positioned between said first sprocket and said second sprocket, said torsion spring being of spiral configuration and permitting limited relative movement between said first sprocket and said second sprocket.

2. A torsionally compliant sprocket assembly as claimed in claim 1, wherein said planar torsion spring is attached to the first sprocket.

3. A torsionally compliant sprocket assembly as claimed in claim 2, wherein said planar torsion spring as an end fixed relative to the first sprocket.

4. A torsionally compliant sprocket assembly as claimed in claim 1, wherein said planar torsion spring is concentrically disposed about said shaft.

5. A torsionally compliant sprocket assembly as claimed in claim 2, wherein said planar torsion spring is attached to the second sprocket.

6. A torsionally compliant sprocket assembly as claimed in claim 1, wherein said first sprocket is mounted on a hub positioned along said shaft.

7. A torsionally compliant sprocket assembly as claimed in claim 6, wherein said second sprocket is mounted on said hub.

8. A torsionally compliant sprocket assembly as claimed in claim 7, wherein a first end of said planar torsion spring is attached to the first sprocket.

9. A torsionally compliant sprocket assembly as claimed in claim 8, wherein a second end of said planar torsion spring is attached to said hub.

* * * * *

UNITED STATES PATENT AND TRADEMARK OFFICE
CERTIFICATE OF CORRECTION

PATENT NO.    : 6,253,633 B1
DATED         : July 3, 2001
INVENTOR(S)   : Philip J. Mott It is certified that error appears in the above-identified patent and that said Letters Patent is hereby corrected as shown below:

<u>Title page,</u>
Item [56], OTHER PRIOR ART, add -- European Search Report for Application No. EP 99306942.6-2306 dated September 18, 2000 --.

<u>Column 6,</u>
Lines 5-6, delete "as an end fixed relative to the first sprocket" and add -- is attached to the shaft --

Signed and Sealed this

Twenty-sixth Day of November, 2002

*Attest:*

*Attesting Officer*

JAMES E. ROGAN
*Director of the United States Patent and Trademark Office*